United States Patent
Marder et al.

(10) Patent No.: US 6,445,092 B1
(45) Date of Patent: Sep. 3, 2002

(54) DUAL-CIRCUIT SEGMENTED RAIL PHASED INDUCTION MOTOR

(75) Inventors: Barry M. Marder; Maynard Cowan, Jr., both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/590,087

(22) Filed: Jun. 7, 2000

(51) Int. Cl.[7] .............................................. H02K 41/02
(52) U.S. Cl. ........................................................ 310/12
(58) Field of Search ............................. 310/12; 104/24, 104/286

(56) References Cited

U.S. PATENT DOCUMENTS

| | | | |
|---|---|---|---|
| 4,727,813 A | * 3/1988 | Matsuo | 104/290 |
| 4,817,494 A | * 4/1989 | Cowen | 318/38 |
| 5,086,881 A | * 2/1992 | Gagnon | 310/312 |
| 5,178,172 A | * 1/1993 | Suzuki | 104/286 |
| 5,552,649 A | * 9/1996 | Cowen | 310/312 |

* cited by examiner

Primary Examiner—Nestor Ramirez
Assistant Examiner—Karen Addison
(74) Attorney, Agent, or Firm—George H. Libman

(57) ABSTRACT

An improved linear motor utilizes two circuits, rather that one circuit and an opposed plate, to gain efficiency. The powered circuit is a flat conductive coil. The opposed segmented rail circuit is either a plurality of similar conductive coils that are shorted, or a plurality of ladders formed of opposed conductive bars connected by a plurality of spaced conductors. In each embodiment, the conductors are preferably cables formed from a plurality of intertwined insulated wires to carry current evenly.

8 Claims, 2 Drawing Sheets

DUAL-CIRCUIT SEGMENTED RAIL PHASED INDUCTION MOTOR

CROSS REFERENCE TO RELATED APPLICATIONS

This invention is related to the disclosure in Provisional Patent Application No. 60/138,118 filed Jun. 7, 1900.

The United States Government has rights in this invention pursuant to Department of Energy Contract No. DE-AC04-94AL85000 with Sandia Corporation.

BACKGROUND OF THE INVENTION

The linear induction motor (LIM) and linear synchronous motor (LSM) are the two conventional linear (motion in a straight line, rather than circular) electric motors. The segmented rail phased induction motor (SERAPHIM) is a recently developed linear electric motor which, although inductive, is very different from a LIM.

A LIM for vehicle applications has an elongated, fixed, reaction rail adjacent the path of the vehicle, and a stator coil carried by the vehicle in reactive proximity to the reaction rail. Operation of the LIM results from the stator embedding magnetic flux in the conducting reaction rail and then interacting with this transient embedded flux. The LIM has two important limitations. First, the time required to embed flux limits the speed at which a LIM can operate, necessitating longer coils for higher speed. Second, the embedded magnetic flux left behind represents an energy loss which hurts the efficiency.

A typical LSM consists of a moving electromagnet and a sequence of coils which are energized in phase with the moving magnet to either attract or repel it. This motor can be quite efficient, especially if the moving electromagnet coil is superconducting. It does, however, efficient, especially if the moving electromagnet coil is superconducting. It does, however, require the entire length of the excursion to be switched and powered, which is costly and restricts its use to places where ample power is available.

SERAPHIM, as disclosed in U.S. Pat. No. 5,552,649 of Cowan and Marder, the disclosure of which patent is incorporated herein by reference thereto, resembles a LSM in that a moving coil interacts with a series of secondary conductors consisting of solid conducting plates, possibly configured in a "segmented rail". Unlike a LIM, this motor uses high frequency pulses (KHz) in the powered coil to induce surface currents in the plates. The pulses are delivered when the plates are in position to produce a force in the desired direction. By operating at high frequency, the current remains near the surface so little flux penetrates the plates. Thus, whereas a conventional LIM operates by embedding flux in a continuous conductor, SERAPHIM operates by excluding flux from the interior and using the edge surface currents to produce the force. Since there is no time required for flux penetration, this motor is capable of much higher speed with no minimum length requirement.

Since the Seraphim motor relies on the exclusion of flux from the reaction rail, it has the following advantages over conventional LIMs for use as a high-speed rail propulsion technology:

It permits a larger gap between the active coil and the reaction rail, at least 2.5 cm (1"), which improves ride quality and relaxes guideway tolerances, significantly reducing construction and maintenance costs.

Very low magnetic drag is induced in the reaction rail (assuming proper motor control), which improves motor efficiency.

It is smaller, lighter, and more compact than a conventional LIM, and has been estimated to cost significantly less to build and operate.

The efficiency of the motor increases with speed.

High frequency operation of the SERAPHIM does have a drawback. The powered SERAPHIM coils have a high inductance, so the circulating power in the coils increases with frequency for a fixed mechanical power. This factor increases the size, weight, and cost of the motor. Furthermore, since electrical power handling equipment is more readily available at standard power frequencies (50 and 60 Hz), there are advantages to operating at these low frequencies. While the solid plates of the SERAPHIM rail could be used at these frequencies, improved performance is realized by replacing the plates with a circuit. The Dual-Circuit SERAPHIM (DCS) is a variation of SERAPHIM which is more efficient and has better electrical properties. The envisioned use of this motor is vehicle propulsion.

SUMMARY OF THE INVENTION

It is an object of this invention to provide a SERAPHIM that can operate efficiently at low frequency.

To achieve the foregoing object, and in accordance with the purpose of the present invention, as embodied and broadly described herein, the present invention may comprise an efficient dual circuit linear motor comprising a powered first circuit comprising a flat powered coil of an elongated electrical conductor having a first end at an inside of the coil and a second end at an outside of the coil; and a source of low frequency AC power connected across the conductor ends. This coil faces a segmented reaction rail comprising a plurality of aligned track circuits, each track circuit comprising a flat track coil of elongated electrical conductor having a first end at an inside of the track coil and a second end at an outside of the track coil, the first end being electrically shorted to said second end by a short length of conductor. The powered coil is in a first plane and the track coils are in a second plane parallel to the first plane, and the powered coil is aligned with and spaced from said track coils so the powered coil can move along said reaction rail.

Additional objects, advantages, and novel features of the invention will become apparent to those skilled in the art upon examination of the following description or may be learned by practice of the invention. The objects and advantages of the invention may be realized and attained as particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
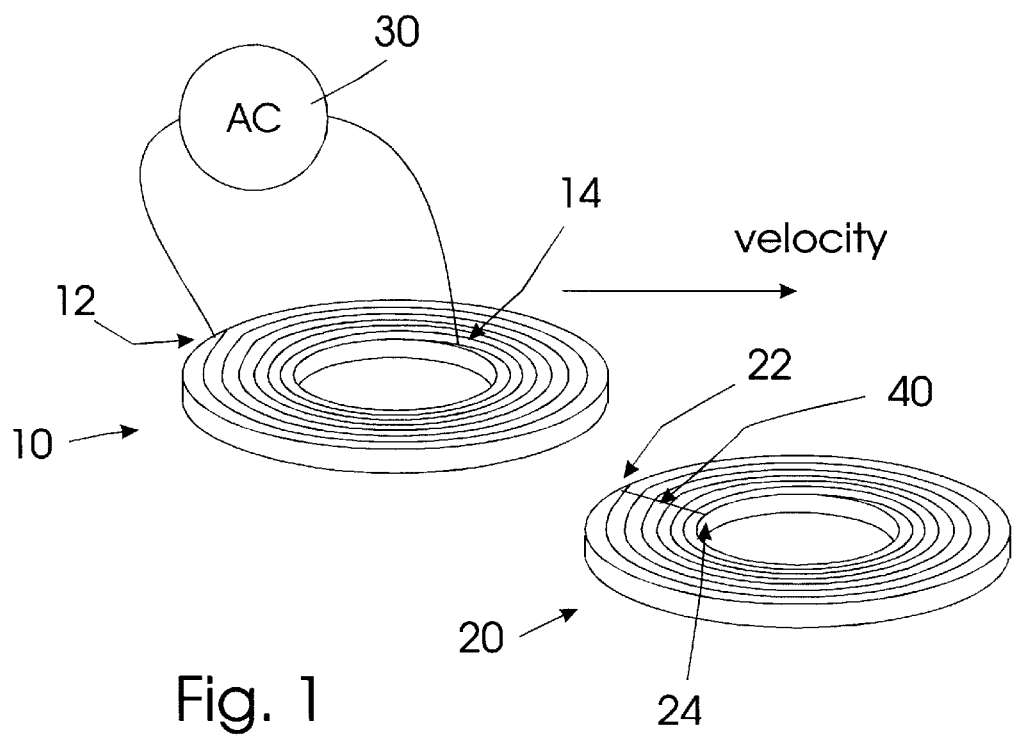
FIG. 1 shows a first embodiment of a DCS.

In the first embodiment of the DCS, shown schematically in FIG. 1, a powered, coil 10 is shown adjacent a shorted- "pancake" track coil 20. A vehicle would carry a plurality of coils 10, and the adjacent rail would have track coils 20 spaced along its length as set forth hereinafter. Powered coils 10 are in a first plane, and track coils 20 are in a second plane parallel to and spaced from the first plane. As shown in the '649 patent, powered coils 10 preferably comprise a sufficient number (up to several hundred) turns of elongated conductor in a plane parallel to the adjacent rail. The outer end 12 and inner end 14 of the conductor forming each coil 10 is connected to a low frequency AC source 30 to power the system. Powered coils 10 move with respect to track coils 20; however, either set of coils could be fixed in position and the other set would move relative to the fixed set.

Each track coil 20 which is essentially identical to the powered coil, but may be of a different material (such as aluminum rather than the more expensive, but better conducting, copper). The outer end 22 and inner end 24 of each track coil 20 are connected with a shorting wire 40.

To ensure uniform distribution of current, each coil 10, 20 is preferably wound from a cable formed from multi-strand wires such as braided or Litz wires, where a plurality of electrically insulated wires are electrically connected to each other at their ends and are wrapped around, braided or otherwise intertwined with each other over the length of the cable. Since each wire of the cable varies along its length from a top position closest to the path of the other coil to a bottom position furthest from the path of the other coil, the voltages induced in all wires is equal, meaning that the current is equally distributed throughout the cable. With a single conductor cable, or the flat conductive plates of the '649 patent, the induced currents choose their own path in the metal. The lower current density and elimination of lingering eddy currents resulting from this invention reduce energy losses to heat.

Another useful feature of the two coil approach is that, because the current path is known, basic electrical engineering circuit models can be used to predict behavior. Such circuit model calculations have indicated that electrical-to-mechanical efficiency of this motor exceeds 80%.

Figure 2:
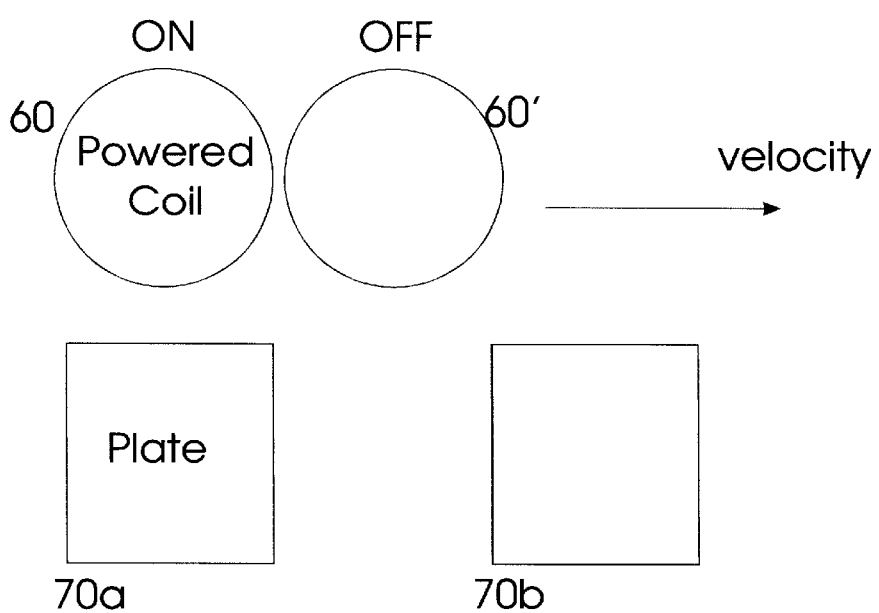
FIG. 2 shows the firing sequence of a prior art SERAPHIM.

While the theoretical efficiency of the shorted coil configuration of this invention is quite high, the "duty cycle" is lower than with the plate. As shown in FIG. 2, for the solid plate 70a as disclosed in the '649 patent, the driving force persists from just past the time the powered coil and plate are centered (60 and 70a) to the time their edges cross (60' and 70a). If the plates 70a, 70b are set in the track one diameter apart, the coil 60 will be energized half the time.

Figure 3:
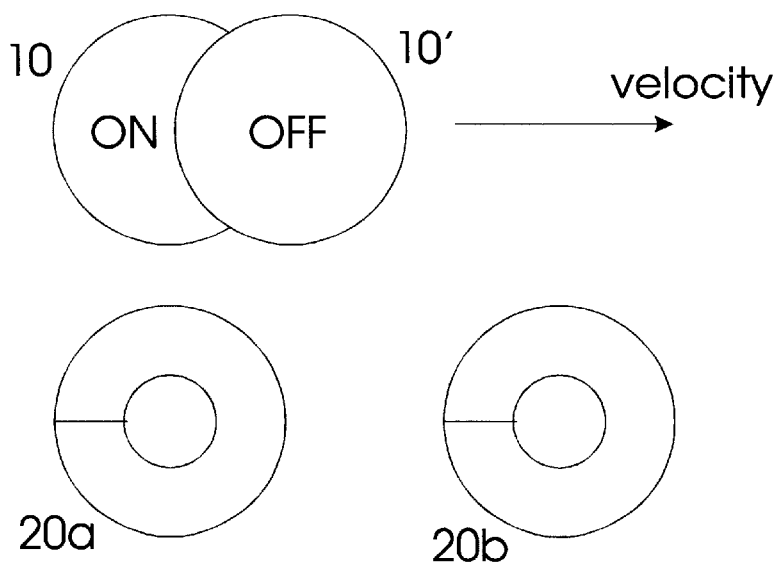
FIG. 3 shows the firing sequence of a DCS.

However, as shown in FIG. 3, the driving force persists in coil 10 only until it is about half way off shorted coil 20a (as indicated by 10'), after which the induced current, and hence the force, changes sign. Thus, the track coils 20a, 20b can be placed half a diameter apart (requiring 33% more coils in the track), but the powered coils are energized only one quarter of the time, as shown in FIG. 3.

Figure 4:
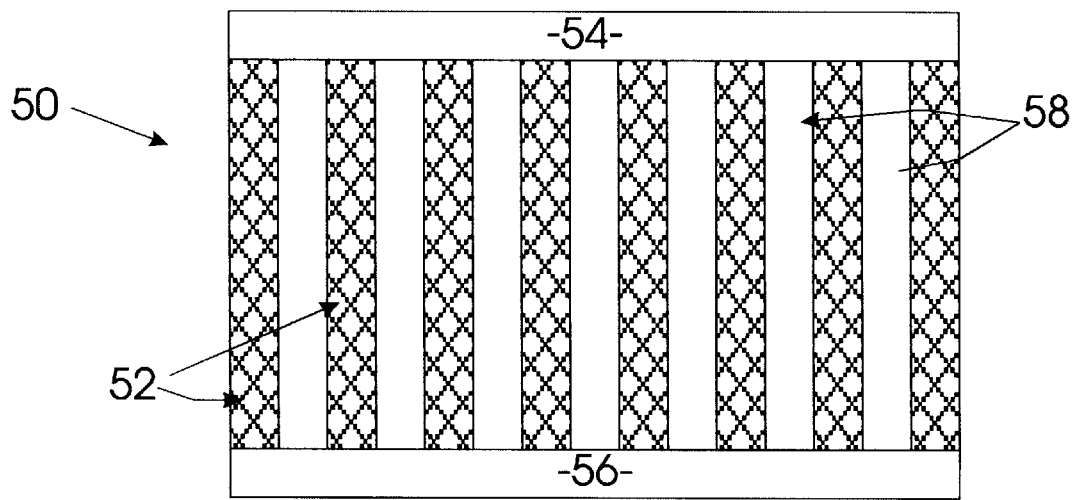
FIG. 4 shows a second embodiment of a DCS.

The second embodiment of the invention shown in FIG. 4 shows a plate 50 which resembles the original plate of the '649 patent with a number of transverse slots 52, forming a 'ladder'. These slots allow the currents to penetrate and also reduce eddy currents. Plate 50 could be formed by merely cutting parallel slots in a metal plate; such a rail segment would provides a number of parallel conductors, but it would not distribute current evenly within each conductor. Accordingly, the preferred embodiment of this circuit is constructed of two spaced, parallel metallic bars 54, 56 connected by an array of multi-strand cable. Because each wire in a cable 58 twists around the center of the cable, the wires samples both the top (near the drive coil) and bottom (away from the drive coil), and the diameter of each individual wire is smaller than a skin depth. Thus, the multi-stranded cable 58 distributes the induced current uniformly throughout its cross section. This reduces the current density and, therefore, the resistive heating losses, which greatly diminishes the possibility of melting the leading edge of the plate, permitting higher currents to be employed.

The cables 58 are embedded in an electrically-insulating underlying structure for mechanical strength. The firing sequence is the same as shown in FIG. 2 for a plate. This ladder circuit 50 can also be analyzed using standard electrical engineering techniques. The duty cycle is the same as for the plate in that a propelling force is generated as long as there is overlap between the powered and passive circuit. The efficiency, however, is around 60%, which is lower than the shorted coil because currents persist in the rear of the ladder (decaying with their L/R time) even after the powered coil has moved forward. (This is the circuit analog of eddy currents in the plate.) As with the plate, the powered coil is energized half the time.

In a typical vehicle application of this embodiment, each cable 58 could have a diameter of about 1" and be formed from at least seven insulated wires; six wires being spiraled around one center wire. Each plate 50 would be about one meter square and have ten to twenty spaced cables 58.

Both of these dual circuit designs will work at low frequency, such as 60 Hertz. Because switching is done at current nulls, the maximum speed will be determined by the size of the coils. That is, in one half period (null to null), the coils can move either half a diameter (shorted coil) or one diameter (ladder).

As with the standard SERAPHIM, the DCS can exist in several geometries. A single powered coil can be flanked by two passive coils, a pair of powered coils can straddle a single passive coil, or a single powered coil can slide past a single passive coil as illustrated. Although not the best electrically, the single-sided design, is the strongest candidate both for mechanical and geometric concerns.

An actual motor design is fundamentally the same for the plate, shorted coil, or ladder. It consists of a series of pancake coils located side by side, energized by an alternating voltage power source. The minimum number of coils required to ensure that at least one will produce a force in either direction is five. A coil is energized when it lies directly above a passive track circuit and remains on until the desired force is no longer produced. At this time another coil is energized. The current remains off in a coil 10 until it is again favorably located with respect to a track circuit 20 or 70.

This invention discloses and claims a SERAPHIM that can be efficiently operated at low frequency commonly provided by power generators. It should be understood that although the invention is disclosed with round coils, rectangular shaped or other flat coils are also contemplated. The sizes of the coils, and the wires which form the coils, are an obvious matter of design to those of ordinary skill in the art.

We claim:

1. An efficient dual circuit linear motor comprising:
    a powered first circuit comprising a flat powered coil of an elongated electrical conductor having a first end at an inside of said coil and a second end at an outside of said coil; and a source of low frequency AC power connected across said conductor ends; and
    a segmented reaction rail comprising a plurality of aligned track circuits, each track circuit comprising a flat track coil of elongated electrical conductor having a first end at an inside of said track coil and a second end at an outside of said track coil, said first end being electrically shorted to said second end by a short length of conductor;

wherein said powered coil is in a first plane and said track coils are in a second plane parallel to said first plane, said powered coil being aligned with and spaced from said track coils, said powered coil moving along said reaction rail.

2. The dual circuit linear motor of claim 1 wherein said conductor for said track coils consists of a cable consisting of a plurality of electrically insulated wires electrically connected to each other at their ends and intertwined with each other over the length of the cable.

3. The dual circuit linear motor of claim 2 wherein said conductor for said powered coil consists of a cable consisting of a plurality of electrically insulated wires electrically connected to each other at their ends and intertwined with each other over the length of the cable.

4. The dual circuit linear motor of claim 3 wherein each of said track coils are approximately the same size and shape as said powered coil.

5. The dual circuit linear motor of claim 4 wherein said track coils are separated from each other by approximately half the diameter of said power coil in a direction parallel to the track.

6. An efficient dual circuit linear motor comprising:

a powered first circuit comprising a flat powered coil of an elongated electrical conductor having a first end at an inside of said coil and a second end at an outside of said coil; and a source of low frequency AC power connected across said conductor ends; and a segmented reaction rail comprising a plurality of aligned electrically conductive track circuits, each track circuit describing a flat rectangle having parallel spaced first and second spaced metallic bars extending parallel to said rail and a plurality of parallel spaced electrical conductors extending between said bars transverse to said rail;

wherein said powered coil is in a first plane and said track rectangles are in a second plane parallel to said first plane, said powered coil being aligned with a spaced from said track rectangles, said powered coil moving along said reaction rail.

7. The dual circuit linear motor of claim 6 wherein each of said electrical conductors extending between said bars consist of a plurality of electrically insulated wires electrically connected to each other at their ends and intertwined with each other over the length of the cable.

8. The dual circuit linear motor of claim 7 wherein each of said track coils are approximately the same size and shape as said powered coil.

* * * * *